United States Patent [19]

Heideman et al.

[11] Patent Number: 4,694,939
[45] Date of Patent: Sep. 22, 1987

[54] SHOCK ABSORBER WITH STOP COLLAR

[75] Inventors: Robert J. Heideman, Westland; Richard T. Mitera, Canton, both of Mich.

[73] Assignee: Enertrols, Inc., Westland, Mich.

[21] Appl. No.: 730,334

[22] Filed: May 3, 1985

[51] Int. Cl.⁴ ............................................. F16F 9/48
[52] U.S. Cl. ............................... 188/287; 188/322.19
[58] Field of Search ............. 188/266, 272, 279, 281, 188/285, 287, 288, 311, 322.11, 315, 319, 322.19; 267/119, 130, 113, 120, 137, 136; 92/169; 244/111; 16/57, 84

[56] References Cited

U.S. PATENT DOCUMENTS

| | | | |
|---|---|---|---|
| 259,634 | 6/1882 | Crouch | 188/311 X |
| 3,782,710 | 1/1974 | Selke et al. | 188/287 X |
| 3,854,596 | 12/1974 | Stephenson et al. | 188/287 X |
| 3,906,771 | 9/1975 | Martin | 72/125 X |
| 3,971,099 | 7/1976 | Wallace | 16/50 |
| 3,974,711 | 8/1976 | Hurst, Jr. et al. | 74/473 |
| 4,065,979 | 1/1978 | Killian | 411/393 X |
| 4,108,245 | 8/1978 | Babineaux | 166/301 |
| 4,174,098 | 11/1979 | Baker et al. | 188/287 X |
| 4,219,189 | 8/1980 | Scrivo et al. | 188/322.11 |
| 4,382,311 | 5/1983 | Watts | 16/84 X |
| 4,482,035 | 11/1984 | Heideman et al. | 188/287 |
| 4,502,673 | 3/1985 | Clark | 188/287 X |

OTHER PUBLICATIONS

Shock Absorbers, Enidine Incorporated, 1983, pp. 4–11.

*Primary Examiner*—Andres Kashnikow
*Assistant Examiner*—Robert J. Oberleitner
*Attorney, Agent, or Firm*—Krass & Young

[57] ABSTRACT

A shock absorber assembly of the so-called primary type in which the outer cylinder includes a central main body smooth walled cylindrical portion and reduced diameter threaded portions are provided at each end of the main body portion for mounting purposes. The assembly of the invention includes a stop collar which is adapted to be threaded onto the front reduced diameter threaded portion of the shock absorber and which has a length which is precisely dimensioned relative to the effective length and stroke of the shock absorber such that the object hitting the impact pad of the shock absorber will encounter the front annular edge of the stop collar just prior to bottoming of the piston of the shock absorber against the end wall of the cylinder. In front mount installations, the length of the stop collar is slightly greater than the length of the reduced diameter front portion of the cylinder plus the effective length of the shock absorber minus the prescribed thickness of the front mounting bracket and minus the stroke of the shock absorber cylinder. In rear mount installations, the length of the stop collar is slightly greater than the length of the front reduced diameter portion plus the effective length of the shock absorber minus the stroke of the shock absorber.

17 Claims, 6 Drawing Figures

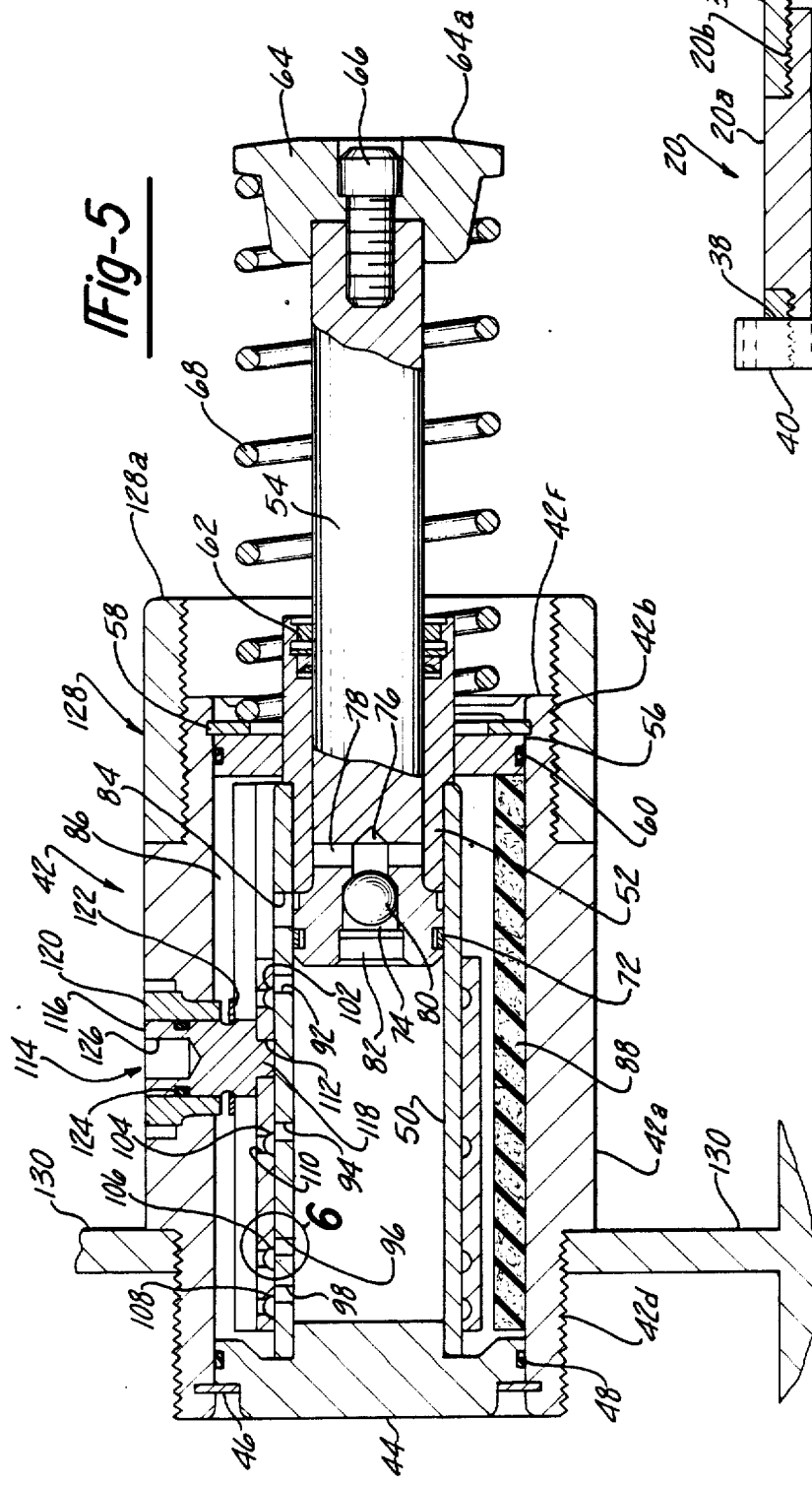
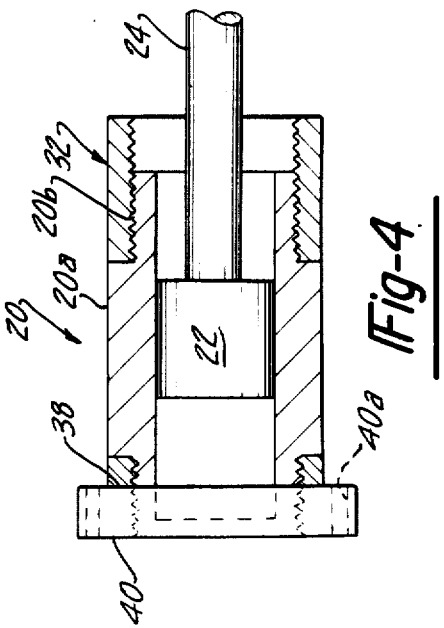
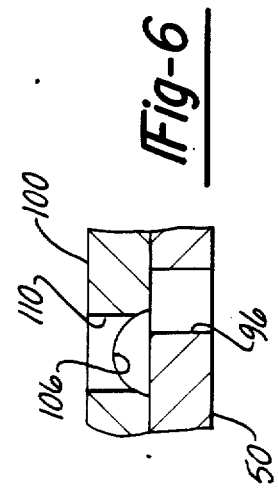

4,694,939

SHOCK ABSORBER WITH STOP COLLAR

BACKGROUND OF THE INVENTION

This invention relates to a shock absorber device for linearly decelerating a machine part by imposing a relatively constant force on the part over the stroke of the device.

Shock absorbers which force fluid through a restricted orifice to convert the kinetic energy of a moving part into an increase in the thermal energy of the fluid are commonly used on machines. The smoothest deceleration of the moving part is obtained by absorbers which offer a constant resistive force to the motion over the total duration of the deceleration.

In a typical installation, a machine tool or transfer arm is repetitively moving back and forth between separate operating positions and the movement of the tool or arm as it arrives at each position is cushioned and decelerated by a shock absorber positioned on the tool or arm or on the adjacent supporting structure. Ideally, as the tool or arm is decelerated at each end of its reciprocal movement, the shock absorber acts to exert a constant resistive force against the tool and smoothly decelerates the tool to a stop position in which the piston of the shock absorber has traversed substantially the entire length of the cylinder of the shock absorber so as to take advantage of the entire range of the fluid orifice means typically provided along the cylinder, and the piston comes to a stop just shy of the end of the cylinder so as to avoid destructive bottoming of the piston against the end of the cylinder. Since it is difficult to obtain these ideal deceleration conditions, and since it is further desirable to provide a positive delimiting means to establish the extent of movement of the tool or arm in each direction of reciprocal movement, it is common practice to employ a stop member at each end of the movement of the tool or arm against which the tool or arm comes to rest as the tool arrives at the end of its movement. Ideally positioned, the stops provide proper end limit positions for the tool or arm, avoid bottoming of the piston against the end of the cylinder to preclude damage to the shock absorber, and precisely position the piston end face with respect to the metering orifices adjacent the end of the stroke so as to provide proper deceleration at the end of the stroke. Although the shock absorber manufacturer commonly provids instructions for proper installation of the stop members at each installation site, it is not unusual that the stop members are not properly positioned with respect to the machine tool or transfer arm with the result that the proper end limit positions for the transfer arm are not established, or the piston bottoms against the end wall of the cylinder with consequent damage to the shock absorber, or the end face of the piston ends up in a position within the cylinder such that the proper deceleration is not provided at the end of the stroke.

SUMMARY OF THE INVENTION

The present invention is directed to the provision of a shock absorber assembly which includes a stop member which is part of the shock absorber assembly and which is readily installed, even by unskilled labor, in a precise position to provide ideal stop performance for the shock absorber.

More specifically, this invention provides a shock absorber assembly which includes a stop member which is assembled to the shock absorber at the point of installation and which is dimensioned relative to the other elements of the shock absorber such that, once installed, it provides ideal stop conditions for the shock absorber.

The invention is specifically directed to shock absorbers of the so-called primary type which include a cylinder which has a main body portion and a reduced diameter threaded portion at the front end thereof forming an annular shoulder with the main body portion and which further includes an end wall closing the rear end of the cylinder.

According to the invention, the shock absorber assembly includes a threaded collar which is threaded onto the reduced diameter threaded portion and which has a length having a predetermined relationship to the predetermined distance between the piston and the end wall of the cylinder in the rest position of the piston so that the object against which the free end of the piston is impacting moves into limiting contact with the leading edge of the collar just before the piston reaches the end wall of the cylinder. This arrangement allows a collar to be provided with the shock absorber assembly which is precisely manufactured and dimensioned relative to the other dimensions of the shock absorber assembly such that it may be threaded onto the reduced diameter threaded portion and precisely positioned on the reduced diameter threaded portion to provide a precisely positioned stop for the absorber.

In installations where the shock is intended to be rear mounted by the use of a further reduced diameter portion at the rear end of the cylinder, the stop collar is adapted to be screwed up against the shoulder between the main body portion of the cylinder and the front reduced diameter threaded portion and has a length that presents the free front annular edge thereof at a distance from the free end of the pad on the free end of the piston rod that is a major fraction of the predetermined distance between the piston and the end of the cylinder in the rest position of the shock absorber so that the front annular edge of the collar comes to rest against the impacting object just prior to bottoming of the piston against the end wall of the cylinder.

In installations where the shock is intended to be front mounted by passing the front reduced diameter threaded portion through a hole in a mounting bracket associated with the mounting structure for the shock absorber to abut the shoulder between the main body portion of the cylinder and the front reduced diameter threaded portion against the rear face of the mounting bracket, the collar is adapted to be screwed up against the front face of the mounting bracket and has a length that presents the free front annular edge thereof at a distance from the free end of the piston rod pad that is a major fraction of the predetermined distance between the piston and the cylinder end in the rest position at the shock absorber so that the front annular edge of the collar comes to rest against the impacting object just prior to bottoming of the piston against the end wall of the cylinder.

According to a further feature of the invention, where the shock is intended for rear mounting, the shock absorber assembly further includes a lock nut sized to screw onto the rear reduced diameter portion of the cylinder to facilitate threaded engagement of the free end of the rear threaded portion in a threaded bore in a mounting bracket associated with the mounting structure for the shock absorber.

According to a further feature of the invention, the shock absorber further includes a mounting flange having a threaded bore for screwing engagement over the free end of the rear reduced diameter threaded portion after the lock nut has been screwed onto the rear reduced diameter portion.

According to a further feature of the invention, the shock absorber further includes adjustment means adjusting the deceleration forces provided upon decelerating impact and the adjusting means includes an adjustment member mounted for rotational movement on the cylinder at a location thereon remote from the shoulder between the main body portion of the cylinder and the front reduced diameter threaded portion. This arrangement ensures that the shoulder between the main body portion of the cylinder and the reduced diameter front portion of the cylinder will remain fixed irrespective of the position of adjustment of the adjustment means so that the shoulder provides a fixed reference plane against which the mounting flange or stop collar may be abutted to provide proper positioning of the stop collar relative to the other elements of the shock absorber installation.

In the disclosed embodiments of the invention, the collar has a length that is sized relative to the length of the reduced diameter threaded portion; the rest distance, or stroke, of the piston from the end wall of the cylinder; and the rest distance, or effective length, from the impact surface of the impact pad to the front end of the reduced diameter threaded portion such that an object impacting the pad will engage the front annular edge of the collar just prior to the piston bottoming out against the end wall of the cylinder.

In one disclosed embodiment of the invention, intended for use in applications where the shock absorber assembly is rear mounted, the collar has a length that is slightly greater than the length of the reduced diameter threaded portion plus the effective length of the shock absorber minus the stroke of the shock absorber so that, with the shock absorber rear mounted by the used of a threaded reduced diameter rear portion on the cylinder and the collar threaded onto the front reduced diameter portion and into abutting engagement with the shoulder defined between the main body portion of the cylinder and the front reduced diameter threaded portion, the distance from the front annular edge of the collar to the front face of the impact pad will be slightly less than the stroke of the shock absorber so that the impacting object will engage the front annular collar edge just prior to bottoming of the piston against the end wall.

In another disclosed embodiment of the invention, intended for applications where the shock absorber is front mounted by passing the front reduced diameter threaded portion through an aperture in a mounting bracket of prescribed thickness, the collar has a length that is slightly greater than the length of the front reduced diameter portion plus the effective length of the shock absorber minus the prescribed thickness of the front mounting bracket and minus the stroke of the shock absorber so that, with the reduced diameter threaded portion passing through the mounting bracket to front mount the shock absorber assembly and the collar threaded onto the reduced diameter portion with its rear annular edge abutting the front face of the mounting bracket, the distance from the front annular edge of the collar to the front face of the impact pad will be slightly less than the stroke of the shock absorber so that the impacting object will engage the front annular edge just prior to bottoming of the piston against the end wall.

BRIEF DESCRIPTION OF THE DRAWINGS

FIG. 4 is a fragmentary schematic view showing a further rear mounting arrangement for the invention shock absorber;

FIG. 5 is a longitudinal cross sectional view showing details of a specific shock absorber construction embodying features of the invention; and FIG. 6 is a view showing details within the circle 6 of FIG. 5.

DETAILED DESCRIPTION OF THE PREFERRED EMBODIMENT

Figure 1:
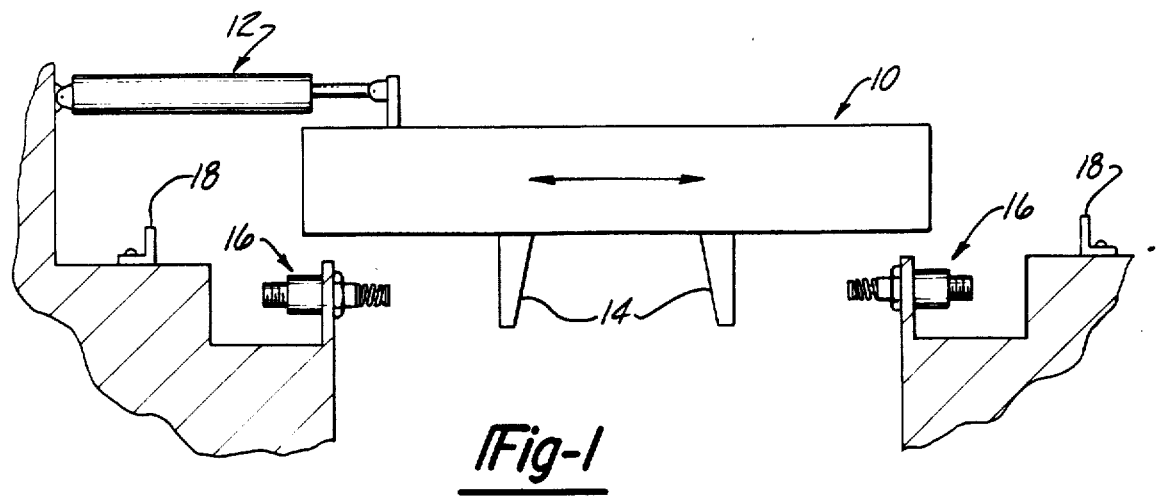
FIG. 1 is a fragmentary diagrammatic view of a typical reciprocating machine tool installation employing shock absorbers to absorb the energy of the machine tool at each end of its reciprocal movement.

In the shock absorber installation as seen in FIG. 1, a machine tool or transfer arm 10 is schematically depicted mounted for reciprocal movement between left and right positions by a power cylinder 12. At each end of its reciprocal movement, a bracket 14 on the member 10 encounters a pad on the leading end of the piston rod of a shock absorber 16 so that as the member 10 approaches each end of its reciprocal stroking movement, it is decelerated to a stop by the respective shock absorber which functions in known manner to absorb the kinetic energy of the moving member. In order to avoid bottoming of the piston of the shock absorber against the end of the cylinder of the shock absorber, precisely define the end limit position of the member 10, and precisely position the piston of the shock absorber within the cylinder of the shock absorber relative to the serially arranged metering orifices within the shock absorber, it is customary to install limit stops 18 at each end of the reciprocal movement of the member. It is of course imperative that the limit stops 18 be precisely positioned relative to the member 10. However, even though the shock absorber manufacturer typically includes detailed instructions with respect to the installation of the stops 18, it is not uncommon for the stops to be improperly or inaccurately positioned with consequent bottoming of the piston of the shock against the end wall of the shock, inaccurate positioning of the member 10 at either or both of its terminal positions, and inaccurate positioning of the piston within the cylinder relative to the serially arranged metering orifices. The present invention avoids the necessity for installing stops 18 at the shock absorber installation by providing stop means as a part of the shock absorber assembly.

Figure 2:
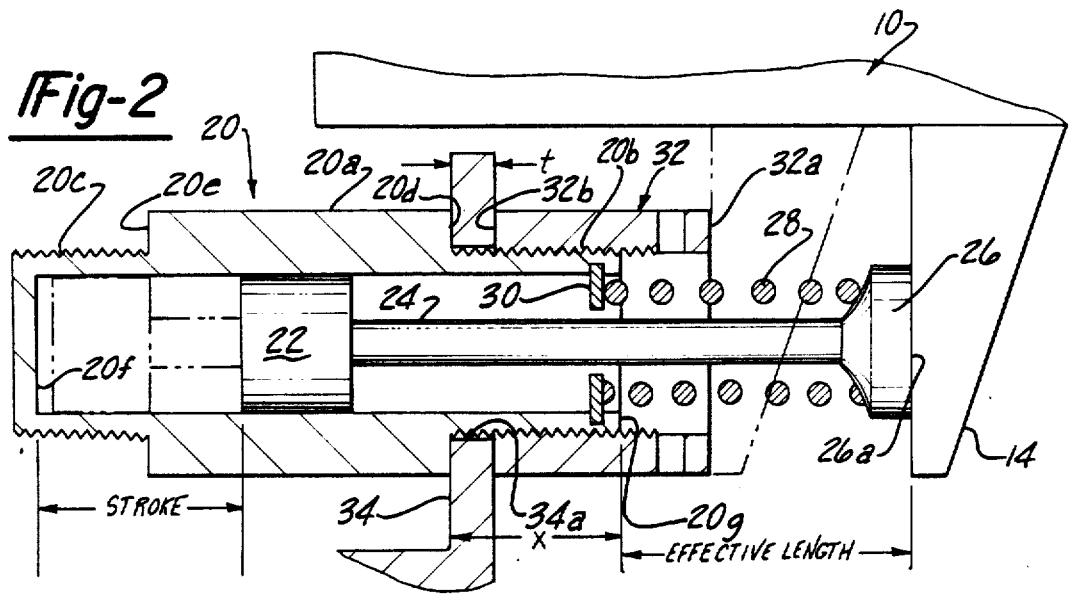
FIG. 2 is a schematic view showing a front mounted shock absorber assembly, embodying features of the invention, in use in the installation of FIG. 1.
Figure 3:
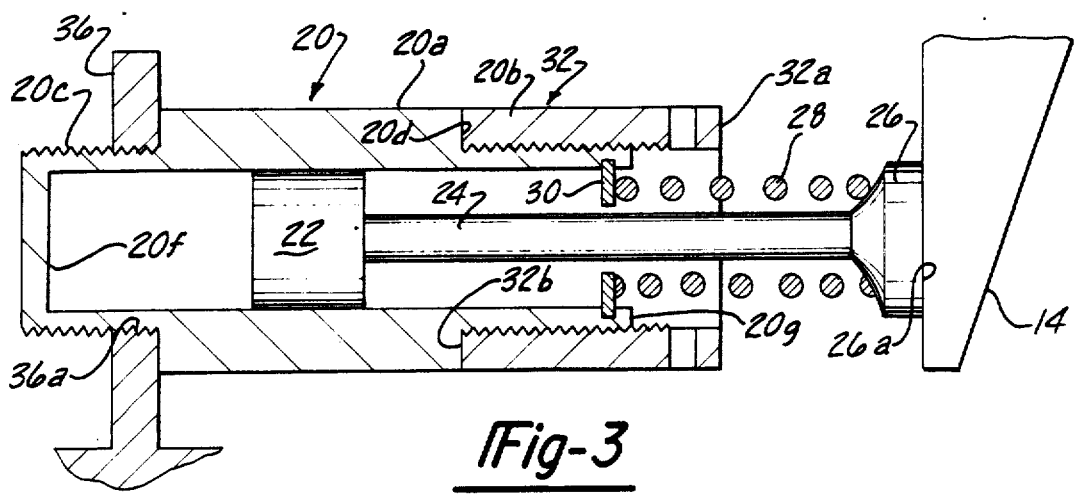
FIG. 3 is a schematic view showing a rear mounted shock absorber assembly, embodying features of the invention, in use in the installation of FIG. 1.

The invention shock absorber assembly, including a stop member as a part of the shock absorber assembly, is illustrated schematically in FIGS. 2, 3 and 4 and in detail, in a preferred embodiment, in FIGS. 5 and 6. In each case, the invention shock absorber is of the so-called primary type in which the external cylinder 20 of the shock absorber includes a main body, smooth walled, cylindrical portion 20a; a front reduced diameter threaded portion 20b; and a rear reduced diameter threaded portion 20c. Front reduced diameter threaded portion 20b forms an annular shoulder 20d with main body cylindrical portion 20a and rear reduced diameter threaded portion 20c forms an annular shoulder 20e with main body cylindrical portion 20a. The shock absorber further includes a piston 22 slideably positioned within the cylinder, a piston rod 24 projecting out of the open front end of the cylinder, an impact pad 26 carried on the free or front end of piston rod 24, and a return coil spring 28 concentrically encircling piston rod 24 and extending between pad 26 and a retainer ring 30 positioned within the open front end of front reduced diameter portion 20b. The shock absorber assembly further includes an internally threaded stop collar 32 threadably mounted on front reduced diameter portion 20b. Collar 32 has a length that is sized relative to the length of reduced diameter portion 20b, relative to the rest distance, or stroke, of the piston 22 from the end wall 20f of the cylinder, and relative to the rest distance, or effective length, from the impact surface 26a of the impact pad 26 to the front annular edge 20g of reduced diameter threaded portion 20b such that an object impacting the pad 26, such as the bracket 14 of reciprocating member 10, will engage the front annular edge 32a of the collar 32 just prior to the piston 22 bottoming out against the cylinder end wall 20f. The invention shock absorber assembly is seen in FIG. 2 applied to a front mount shock absorber installation and in FIGS. 3 and 4 applied to rear mount shock absorber installations.

In the front mount shock absorber installation of FIG. 2, front reduced diameter portion 20b is passed through a smooth or threaded bore 34a in a support bracket 34 and stop collar 32 is threaded onto reduced diameter portion 20b to bring the rear annular edge 32b of the collar into abutting engagement with the front face of mounting bracket 34. In this front mounted installation, the collar 32 has a precise length which is slightly greater than the length of reduced diameter portion 20b plus the effective length between the front annular edge 20g of reduced diameter portion 20b and the front impact face 26a of impact pad 26 minus the thickness "t" of mounting bracket 34 and minus the stroke of the shock absorber. When given this carefully controlled and precisely defined length, the distance from the front annular edge 32a of the collar to the front impact face 26a of the pad is slightly less than the stroke of the shock absorber so that the impacting object such as bracket 14 will engage the front annular collar edge 32a just prior to bottoming of piston 22 against end wall 20f.

In a typical front mount installation where the effective length of the shock absorber is 1.96875 inches, the stroke of the shock absorber is 1.00 inches, the length of the reduced diameter front threaded portion is 0.90 inches, the thickness of the mounting bracket is 0.375 inches, and it is desired to stop the piston 0.0625 inches shy of end wall 20f, the length of collar 32 will be 1.96875 inches minus 1.00 inches plus 0.90 inches minus 0.375 inches plus 0.0625 inches or 1.556 inches.

In the rear mount shock absorber installation of FIG. 3, rear reduced diameter portion 20c is passed through a smooth or threaded bore 36a in a rear mounting bracket 36 and the stop collar 32 is threaded onto reduced diameter front portion 20b until the rear annular 32b of the stop collar abuts against shoulder 20d. In this rear mount embodiment, stop collar 32 has a length that is slightly greater than the length of reduced diameter portion 20b plus the effective length of the shock absorber minus the stroke of the shock absorber. With this length, the distance from the front annular edge 32a of the stop collar to the front face 26a of the impact pad is slightly less than the stroke of the shock absorber so that impacting objects such as the bracket 14 will engage the front annular collar edge 32a just prior to bottoming of piston 22 against end wall 20f. For example, if the shock absorber has an effective length of 1.9685 inches and a stroke of 1.00 inches, the length of reduced diameter portion 20b is 0.900 inches, and it is desired to stop the piston 0.0625 inches shy of end wall 20f, stop collar 32 will have a length equal to 1.9687 inches plus 0.900 inches minus 1.00 inches plus 0.0625 inches, or 1.9312 inches.

The shock absorber assembly of the invention may also, as seen in FIG. 4, include a lock nut 38 and a mounting flange 40. When the lock nut 38 and mounting flange 40 are included as a part of the assembly, the shock absorber is rear mounted by threading the ring 38 onto reduced diameter portion 20c and thereafter threading flange 40 onto reduced diameter portion 20c into locking engagement with the rear annular face of lock nut 38. Flange 40 is then secured to a suitable support surface by suitable fasteners passing through mounting holes 40a in the mounting bracket. Lock nut 38 may also be used in the rear mount arrangement of FIG. 3, in which case lock nut 38 is screwed onto rear reduced diameter threaded portion 20c and into locking engagement with the rear face of mounting bracket 36 to preclude movement of the bracket relative to the shock absorber assembly.

Since the precise length of the invention stop collar is critical to the effective functioning of the invention shock absorber assembly, it is important that the stop collar be surface hardened to avoid wear, and consequent loss of dimensional integrity, with extended usage. For example, the invention stop collar may be suitably heat treated to produce a surface hardness of 60 Rockwell on a C scale.

A specific practical embodiment of the invention shock absorber assembly is seen in FIG. 5. The shock absorber assembly of FIG. 5 includes an outer cylinder 42 including a main body, smooth walled cylindrical portion 42a; a front reduced diameter threaded portion 42b forming a shoulder 42c with main body portion 42a; and a rear reduced diameter threaded portion 42d forming a shoulder 42e with main body portion 42a. The rear end of outer cylinder 42 is closed by an end cap 44 secured to the inner wall of cylinder 42 by a retaining ring 46 with an O ring 48 providing a fluid seal therebetween.

A tubular metering cylinder 50 is fixedly supported at its rear end on end cap 44 and projects forwardly into cylinder 42. The outer diameter of metering cylinder 50 is substantially smaller than the inner diameter of outer cylinder 42 so that an annular volume is formed therebetween. The forward inner wall of cylinder 50 engages a cylindrical sleeve bearing 52 adapted to slidingly support an elongated piston rod 54 that projects out of the forward end of the assembly. Bearing 52 is held in place by an annular bushing 56 fixed relative to outer cylinder 42 by a retainer ring 58. An O ring 60 provides a fluid seal between bushing 56 and outer cylinder 42. An annular seal assembly 62 provides sealing engagement between piston rod 54 and the forward inner end of bearing 52 in a known manner.

At its forward end, piston rod 54 carries a button or impact pad 64 secured by a screw 66 threaded into a hole in the end of the piston rod. A spiral spring 68 extends between the rear side of pad 64 and retaining ring 58, thereby acting to return the piston rod to its normal extended position after the impacting part is moved away from the shock absorber. A piston head 70 is formed integrally with the rear end of piston rod 54. A groove on the outer diameter of piston head 70 carries a piston ring 72 bearing against the inner diameter of metering cylinder 50. The rear end of piston head 70 is formed with a central aperture 74 which communicates at its forward end with a central cavity 76. Cavity 76 in turn communicates with a vertically oriented bore 78. The concave surface between the larger aperture 74 and the smaller cavity 76 acts as a seat for a ball check valve 80. A valve retainer is provided rearwardly of the ball by way of a retainer ring 82. When the piston moves rearwardly under the influence of a force exerted on impact pad 64 by a machine part, the cavity 76 is sealed by ball 80 and when the piston moves in the forward direction under the force of return spring 54, a free flow path is established through aperture 74, cavity 76, and bore 78.

Bore 78 communicates with an opening 84 in the forward end of metering cylinder 50. Opening 84 is in further communication with the annular volume 86 between the inner wall of outer cylinder 42 and the outer wall of metering cylinder 50. An accumulator pad 88 substantially fills the entire volume 86. Pad 88 is formed of cellular rubber which may be filled with nitrogen to give it a high degree of resilience and includes an axial slot 90 providing clearance for the adjuster mechanism and metering orifices as will be explained.

Four straight-sided circular holes 92, 94, 96, 98 are formed radially through the wall of metering cylinder 50. The four holes 92, 94, 96, 98 are in longitudinal alignment with one another and their respective spacings are arranged at exponentially decreasing distances in the direction of the rear of metering cylinder 50.

A metering sleeve 100 slideably surrounds the outer diameter of metering cylinder 50. Four internal grooves 102, 104, 106 and 108 are formed on the internal periphery of sleeve 100. The grooves are spaced at exponentially decreasing distances in the direction of the rear of the sleeve and generally correspond to and respectively coact with the four holes 92, 94, 96, 98 in the metering cylinder. Each groove is of semicircular cross sectional configuration and has a diameter slightly greater than the diameter of the cylinder holes 92, 94, 96, 98. Grooves 102, 104, 106, 108 lie in longitudinally spaced parallel planes normal to the axis of the cylinder and sleeve and have a uniform semicircular cross section throughout their circumferential extent. A straight-sided hole 110 is formed in metering sleeve 100 in association with each groove. Each hole 110 opens at its outer end in the outer surface of sleeve 100 and opens at its inner end in the associated groove. Each hole 110 is centered on the associated groove and has a diameter slightly less than the diameter of the associated groove so that the hole intersects the associated groove at a location close to but spaced from the inner periphery of the sleeve. Sleeve 100 further includes a relatively large diameter circular hole 112 positioned between grooves 102 and 104.

An adjuster mechanism seen generally at 114 is provided to vary the extent of overlap between grooves 102, 104, 106, 108 and cylinder holes 92, 94, 96, 98. Adjuster mechanism 114 includes a stub shaft 116 having an off-set cam portion 118 formed at its innermost end. Cam portion 118 is received within hole 112 in sleeve 100. Stub shaft 116 is mounted for rotation by way of a surrounding collar 120 fixed to outer cylinder 42. A retaining ring 122 lies within a circumferential groove in stub shaft 116 above cam portion 118 to restrict upward movement of the shaft. An O ring 124 provides a fluid seal between shaft 116 and collar 120. A socket 126 formed along the vertical center line of shaft 116 is adapted to receive a suitably conforming tool for rotating the shaft. It will be understood that rotation of shaft 116 serves to move sleeve 100 in an orbital pattern with respect to metering cylinder 50 so that the metering orifice size is selectively varied in response to selective rotation of shaft 116 to selectively vary the performance and setting of the shock absorber. Further details of the manner in which the semicircular grooves coact with the metering cylinder to selectively vary the performance of the shock absorber are disclosed in Applicant's co-pending U.S. patent application Ser. No. 730,334, filed June 7, 1985.

The shock absorber assembly of FIG. 5 further includes a stop collar 238 threaded onto reduced diameter threaded portion 42b. As discussed with reference to FIGS. 2 and 3, the length of stop collar 128 will vary depending upon whether the shock absorber is intended for front mounting or rear mounting. Specifically, if, as illustrated in FIG. 5, the shock absorber assembly is rear mounted by the use of a mounting flange 130 engaging reduced diameter threaded portion 42d, the stop collar 238 will have a length that is slightly greater than the length of reduced diameter outer cylinder portion 42b plus the effective length of the shock absorber assembly (that is, the length between the front annular edge 42f of threaded portion 42b and the front impact face 64a of impact pad 64) minus the stroke of the cylinder. With this arrangement, and as previously described, with the collar threaded onto the front reduced diameter portion 42b and into abutting engagement with shoulder 42c, the distance from the front annular edge 128a of the stop collar to the impact face 64a of the impact pad will be slightly less than the stroke of the shock absorber assembly so that the impacting object will engage the front annular edge 128a of the stop collar just prior to bottoming of the piston 70 against end wall 44.

If front mounting of the shock absorber assembly is intended, and as previously discussed, the length of stop collar 128 would be slightly greater than the length of reduced diameter portion 42b plus the effective length of the shock absorber assembly minus the stroke of the shock absorber assembly and minus the prescribed thickness of the front mounting bracket against which the rear annular edge of the stop collar would abut. In actual practice, the shock absorber assembly would come complete with instructions with respect to mounting and, specifically, would precisely specify the thickness of the front mounting bracket (for example, ⅜ of an inch) which would be employed by the installer to ensure precise positioning of the front annular edge 128a on the stop collar relative to impact surface 64a.

The invention shock absorber assembly will be seen to provide many important advantages. Specifically, the provision of a stop collar that is precisely dimensioned with respect to the other critical dimensions of the shock absorber assembly avoids bottoming of the piston against the end wall of the cylinder with consequent severe damage to the shock absorber assembly; provides a proper and precise definition of the end of stroke position of the associated transfer arm or machine tool;

and precisely positions the piston face at the end of its stroke with respect to the orifices in the metering cylinder so as to provide precise and proper deceleration of the piston as it moves through the critical end portion of its stroke.

Whereas the preferred embodiments of the invention have been illustrated and described with reference to the accompanying drawings, it will be apparent that various changes may be made in the disclosed embodiments without departing from the scope or spirit of the invention.

We claim:

1. An elongated shock absorber comprising:
   (A) a main body portion;
   (B) a reduced diameter front end portion forming an annular shoulder with said main body portion;
   (C) a piston assembly including a piston slideably mounted in said shock absorber for axial movement between a rest position and a working position proximate but spaced from the rear end wall of said shock absorber, a piston rod secured to said piston and extending axially forwardly out of the front end of said reduced diameter portion, and an impact pad on the front end of said piston rod;
   (D) an elongated annular stop collar sized to fit telescopically over said reduced diameter portion; and
   (E) means mounting said collar telescopically over said reduced diameter portion in a predetermined position relative to said shoulder, with the front annular end of said collar spaced forwardly from the front end of said reduced diameter portion and the rear annular end of said collar proximate said shoulder, and operative in response to an object impacting said pad and striking the free annular end of said collar to transmit the impact loading at the rear annular edge of said collar in a straight axial line into said shoulder for absorption by said main body portion.

2. A shock absorber assembly according to claim 1 wherein:
   (F) said assembly includes means for adjusting the decelerating force provided upon impact of the moving object with said pad; and
   (G) said adjusting means includes an adjustment member mounted for rotational movement on said main body portion of said cylinder.

3. A shock absorber assembly according to claim 2 wherein:
   H. said adjustment member comprises a dial mounted in the cylindrical wall of said main body portion of said cylinder for rotation about an axis generally normal to the lengthwise axis of said cylinder.

4. A shock absorber assembly according to claim 1 wherein:
   (F) said collar has a length that is related to the length of said reduced diameter portion, the rest distance, or stroke, of said piston from said end wall, and the rest distance, or effective length, from the impact surface of said impact pad to the front end of said reduced diameter portion such that, with the collar in its predetermined position relative to said shoulder, the front annular end of the collar projects forwardly beyond the front end of said reduced diameter portion by a distance such that an object impacting said pad will reach the front annular end of said collar just prior to said piston bottoming out against said end wall.

5. A shock absorber assembly according to claim 4 wherein:
   (G) said reduced diameter portion is externally threaded and is adapted to pass through an aperture in a mounting bracket of prescribed thickness to provide front mounting of said shock absorber assembly; and
   (C) said collar is internally threaded and has a a length than is slightly greater than the length of said reduced diameter portion plus said effective length minus said prescribed thickness and minus said stroke whereby, with said reduced diameter portion passing through the mounting bracket to front mount said shock absorber assembly and said collar threaded onto said reduced diameter portion with its rear annular edge abutting the mounting bracket, the distance from the front annular edge of said collar to the front face of said pad will be slightly greater than said stroke so that the impacting object will engage said front annular collar edge just prior to bottoming of said piston against said end wall.

6. A shock absorber according to claim 4 wherein:
   (G) said reduced diameter of front end portion is externally threaded;
   (H) said cylinder further includes another reduced diameter threaded portion at its rear end to facilitate rear mounting of said shock absorber assembly; and
   (I) said collar is internally threaded and has a length that is slightly greater than said front reduced diameter portion plus said effective length minus said stroke whereby, with said shock absorber assembly rear mounted by the use of said rear reduced diameter portion and said collar threaded onto said front reduced diameter portion and in abutting engagement with said shoulder, the distance from the front annular edge of said collar to the front face of said pad will be slightly greater than said stroke so that the impacting object will engage said front annular collar edge just prior to bottoming of said piston against said end wall.

7. A shock absorber assembly according to claim 1 wherein:
   (F) said main body portion is constituted by an outer cylinder;
   (G) said assembly further includes an inner, metering cylinder positioned concentrically within said outer cylinder in spaced relation thereto and slideably receiving said piston;
   (H) a plurality of longitudinally spaced holes are provided in said inner cylinder; and
   (I) said assembly further includes a sleeve slideably surounding said inner cylinder and having
      (1) a plurality of annular internal grooves of smooth arcuate cross section corresponding in number and longitudinal spacing to said holes in said inner cylinder, and
      (2) a hole associated with each groove opening at its outer end in the outer surface of said sleeve and opening at its inner end in the associated groove to coact with that groove and with the associated hole in said inner cylinder to define a metering passage for hydraulic fluid.

8. A shock absorber assembly according to claim 7 wherein:
   (J) each said groove is generally semicircular in cross section and each said sleeve hole is generally circular and has a diameter generally corresponding to the diameter of said groove.

9. A shock absorber assembly according to claim 8 wherein:
(K) each said inner cylinder hole is generally circular and has a diameter less than the diameter of said sleeve holes.

10. A shock absorber according to claim 1 wherein:
(F) said mounting means comprises coacting external threads on said reduced diameter portion and internal threads on said collar; and
(G) said collar is threaded onto said reduced diameter portion to bring the rear annular edge thereof into abutting engagement with said shoulder so that said impact loading is transmitted directly into said shoulder from said rear annular edge of said collar.

11. A shock absorber assembly according to claim 10 wherein:
G. said cylinder further includes another reduced diameter threaded portion at the rear end thereof; and
H. said shock absorber assembly further includes a lock nut sized to screw onto said rear reduced diameter portion to facilitate threaded engagement of the free end of said rear threaded portion in a threaded bore in a mounting bracket associated with the mounting structure for said shock absorber assembly.

12. A shock absorber assembly according to claim 11 wherein:
I. said shock absorber assembly further includes a mounting flange having a threaded bore for screwing engagement over the free end of said rear threaded portion after said lock nut has been screwed onto said rear threaded portion.

13. A shock absorber according to claim 1 wherein:
(F) said mounting means comprises;
  (1) coacting external threads on said reduced diameter portion and internal threads on said collar; and
  (2) a mounting bracket of predetermined thickness having an aperture therein having a diameter greater than the diameter of said reduced diameter portion and less than a diameter of said main body portion; and
(G) said collar is mounted on said reduced diameter portion by passing said reduced diameter portion through said aperture to bring said shoulder into abutting engagement with the rear face of said bracket and threading said collar onto said reduced diameter portion to bring said rear annular edge of said collar into abutting engagement with the front face of said bracket so that said impact loading is transmitted from said rear annular edge of said collar into said shoulder through said bracket.

14. A method of installing a shock absorber in a manner to prevent bottoming of the piston of the shock absorber against the rear end wall of the shock absorber in response to an object impacting against the impact pad carried on the free end of the piston rod of the shock absorber and provide a precise predetermined position for the impacting object, said method comprising:
(A) providing a shock absorber having a main body portion;
(B) providing a reduced diameter front end portion on said shock absorber forming an annular shoulder with said main body portion;
(C) providing a piston assembly including a piston slideably mounted in the shock absorber for axial movement between a rest position and a working position proximate but spaced from the rear end wall of the shock absorber, a piston rod secured to the piston and extending axially forwardly out of the front end of the reduced diameter portion, and an impact pad on the front end of the piston rod;
(D) providing an annular stop collar sized to fit telescopically over said reduced diameter portion; and
(E) mounting said collar telescopically over said reduced diameter portion in a manner such that the front annular end of said collar is spaced forwardly from the front end of said reduced diameter portion, the rear annular end of said collar is proximate said shoulder, and the impact loading appearing at the rear annular edge of the collar in response to the impacting object impacting the front end of said collar is transmitted in a straight axial line into said shoulder for absorption by said main body portion.

15. A method according to claim 14 wherein said mounting step comprises:
(F) providing coactng external threads on said reduced diameter portion and internal threads on said collar; and
(G) threading said collar onto said reduced diameter portion to bring the rear annular end of said collar into abutting engagement with said shoulder.

16. A method according to claim 14 wherein said mounting step comprises:
(F) providing coacting external threads on said reduced diameter portion and internal threads on said collar;
(G) providing a mounting bracket having an aperture therein having a diameter greater than the diameter of said reduced diameter portion and less than a diameter of said main body portion;
(H) passing said reduced diameter portion through said aperture in said mounting bracket to bring said shoulder into abutting engagement with the rear face of said bracket; and
(I) threading said collar onto said reduced diameter portion to bring the rear annular end of said collar into abutting engagement with the front face of said bracket.

17. A method of mounting a shock absorber in a manner to simultaneously secure the shock absorber to a support structure, prevent bottoming of the piston of the shock absorber against the rear end wall of the shock absorber, and provide a precise predetermined end limit position for an object impacting the impact pad secured to the free end of the piston rod of the shock absorber, said method comprising the steps of:
(A) forming a threaded reduced diameter portion at the front end of the shock absorber forming an annular shoulder with the main body portion of the shock absorber;
(B) providing a bracket of predetermined thickness and having an aperture having a diameter larger than the diameter of said reduced diameter portion and smaller than the diameter of said body portion;
(C) securing said bracket to the support structure;
(D) passing said reduced diameter portion through said aperture to position the rear face of said bracket against said shoulder;
(E) providing an annular internally threaded stop collar of circular cross-section adapted to be threaded onto said reduced diameter portion and having a predetermined length slightly greater than the length of said reduced diameter portion plus the rest distance, or effective length, from the impact surface of said impact pad to the front end of said reduced diameter portion minus said predetermined bracket thickness and minus the rest distance, or stroke, of said piston from said rear end wall; and (F) threading said collar onto said reduced diameter portion and into abutting engagement at its rear annular edge with the front face of said bracket to rigidly mount said shock absorber on said bracket and simultaneously position the front annular edge of said collar forwardly of the front end of said reduced diameter portion by a precisely determined distance such that the impacting object will engage said front annular edge just prior to bottoming of said piston against said end wall and the impacting object will be stopped at its precise predetermined end limit position.

* * * * *

UNITED STATES PATENT AND TRADEMARK OFFICE
CERTIFICATE OF CORRECTION

PATENT NO. : 4,694,939

DATED : September 22, 1987

INVENTOR(S) : Robert Heideman et al

It is certified that error appears in the above-identified patent and that said Letters Patent is hereby corrected as shown below:

Column 1, line 47 "provids" should be --provides--.

Column 10, line 8-9 "has a a length than is" should be --has a length that is--.

Column 8, line 20 "Ser. No. 730,334" should be --Ser. No. 742,408--.

Column 8, line 22 "238" should be --128--.

Column 8, line 30 "238" should be --128--.

Signed and Sealed this

Twenty-first Day of June, 1988

Attest:

DONALD J. QUIGG

Attesting Officer

Commissioner of Patents and Trademarks